United States Patent [19]

Gietman, Jr.

[11] Patent Number: 4,642,084
[45] Date of Patent: Feb. 10, 1987

[54] PLASTIC BAG MAKING MACHINE

[75] Inventor: Peter J. Gietman, Jr., Combined Locks, Wis.

[73] Assignee: Custom Machinery Design, Inc., Appleton, Wis.

[21] Appl. No.: 793,851

[22] Filed: Nov. 1, 1985

Related U.S. Application Data

[62] Division of Ser. No. 641,768, Aug. 17, 1984, Pat. No. 4,567,984.

[51] Int. Cl.⁴ .............................................. B31B 23/16
[52] U.S. Cl. .................................. 493/190; 493/197; 493/208; 493/233; 493/254; 493/474; 156/583.1; 83/349; 83/668; 29/124; 226/175
[58] Field of Search ............... 493/195, 196, 197, 198, 493/200, 201, 202, 208, 230, 231, 233, 238, 254, 474, 190; 156/582, 510, 583.1; 29/124, 117; 226/171, 175; 83/349, 668, 678

[56] References Cited

U.S. PATENT DOCUMENTS

| | | | |
|---|---|---|---|
| 688,917 | 12/1901 | Young | 29/124 |
| 1,428,760 | 9/1922 | Cuish | 29/117 |
| 3,509,799 | 5/1970 | Weis et al. | 493/197 |
| 3,558,400 | 1/1971 | Horvath et al. | 493/198 |
| 3,610,113 | 10/1971 | Schwarzkopf | 493/196 |
| 3,826,361 | 7/1974 | Heckrodt | 206/409 |
| 3,996,093 | 12/1976 | Winnemoller | 156/358 |
| 4,294,145 | 10/1981 | Bodewein | 83/302 |
| 4,487,599 | 12/1984 | Bendig et al. | 493/194 |
| 4,500,307 | 2/1985 | Bridgeman | 493/196 |

FOREIGN PATENT DOCUMENTS

| | | | |
|---|---|---|---|
| 2229221 | 11/1974 | France | 493/231 |
| 4823 | of 1894 | United Kingdom | 206/494 |

Primary Examiner—Lowell A. Larson
Assistant Examiner—William E. Terrell
Attorney, Agent, or Firm—John C. Cooper, III; Fred Wiviott

[57] ABSTRACT

A machine for making plastic bags, such as trash or garbage bags, includes a rotary sealing drum of variable diameter, the drum including one or more sealing bars for cross-sealing a flattened plastic film tube passing through the machine. A blanket tensioning system surrounds the drum and is adjustable to compensate for different drum diameters. The sealed film passes over a chill roll after leaving the drum-blanket assembly and is drawn over folding boards by pull rolls. The sealed and folded film is then perforated by a fly knife and is preferably also cut on the sides to produce a connected series of bags which may easily be separated from one another to make the bags suitable for easy dispensing packages. A variator assembly may also be provided to insure a proper skirt length between the cut-perforation and the bag seal.

13 Claims, 11 Drawing Figures

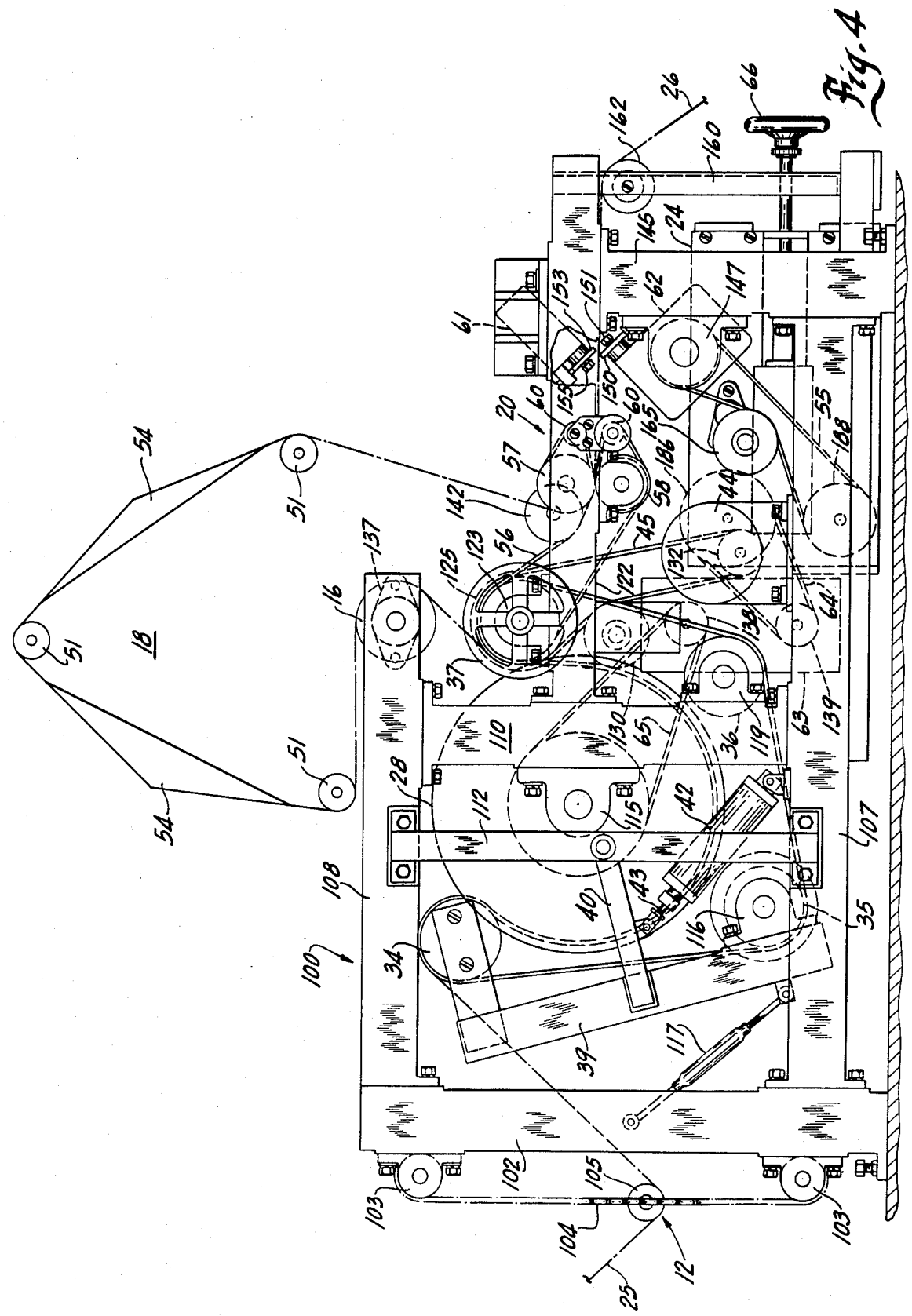

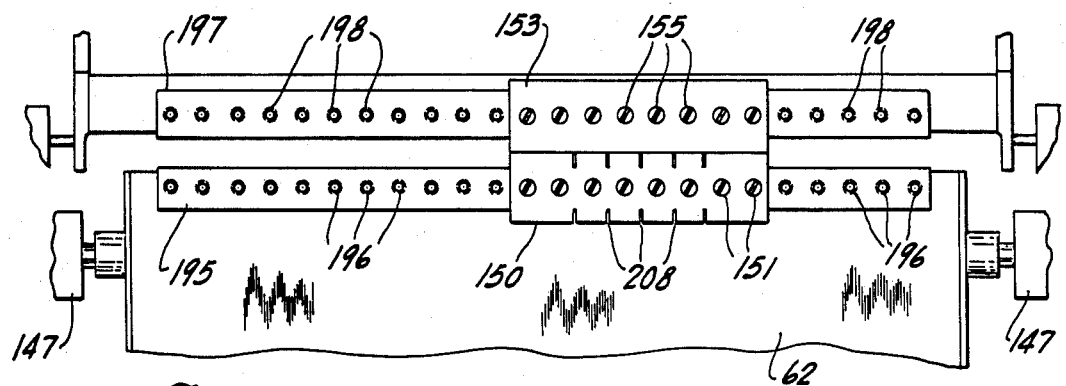
Fig. 7
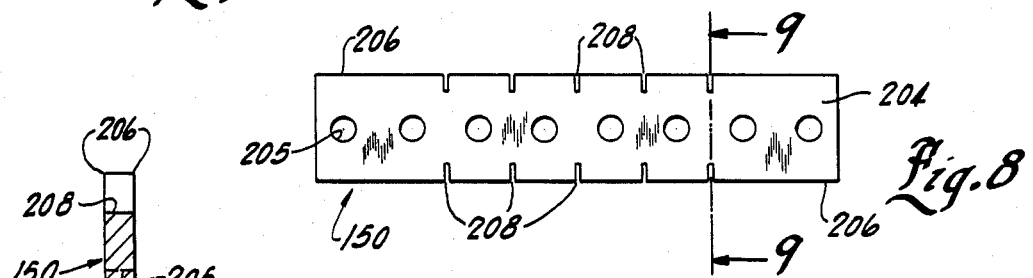
Fig. 8
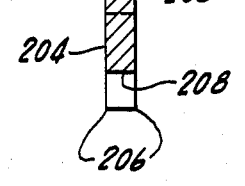
Fig. 9
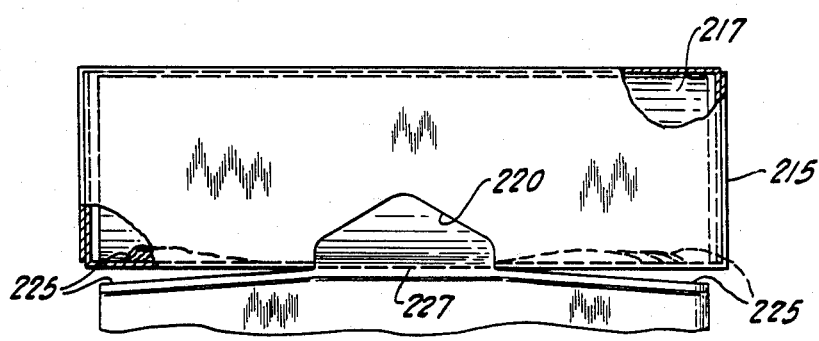
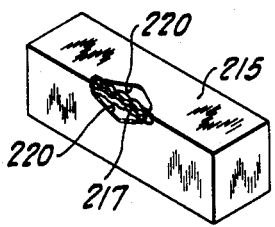
Fig. 11
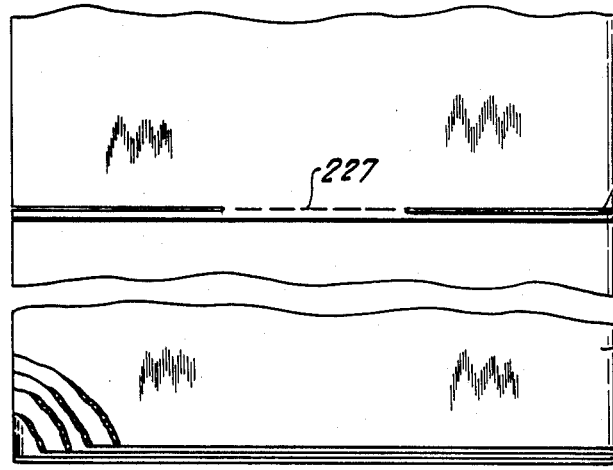
Fig. 10

PLASTIC BAG MAKING MACHINE

CROSS-REFERENCE TO RELATED APPLICATIONS

This is a division, of application Ser. No. 641,768, filed Aug. 17, 1984 U.S. Pat. No. 4,567,984.

BACKGROUND OF THE INVENTION

1. Field of the Invention

The present invention relates generally to the art of plastic bag making machines, and more particularly to bag machines which employ a rotary sealing drum. Still more particularly, the invention relates to a plastic bag making machine which produces a novel type of folded bag which is partially cut and partially perforated to provide for the easy dispensing of bags.

2. Description of the Prior Art

Many different types of plastic bag making machines are known to the art for producing plastic bags for industrial and individual consumers for many different applications (e.g. small sandwich bags and trash bags). While the present invention has a wide range of applications for the production of such products, the prior art will be explained by reference to one particular class of bags, i.e., polyethylene trash bags or, garbage bags and wastebasket liners of the type usually sold in boxes of folded bags or rolls of bags.

In the manufacture of such products, it is first necessary to prepare a plastic film tube, which is usually accomplished by an extruder. Heat and pressure are applied to pellets of polyethylene to melt the starting material which is then forced through a ring die. As the polyethylene leaves the die, air is injected through the center of the die to form a tube or bubble. This process is known as the "blown tubing" process.

The tube is then cooled by air or water rings so that the hot plastic sets. The tube is then conveyed to nip rollers which flatten the tube for subsequent processing. The tube at this point is seamless and is ready for downstream processing. The particular plastic starting material, the diameter of the tube, the thickness of the plastic and a wide variety of other variables may be controlled by the manufacturer for a particular end use application.

By downstream processing is meant the various manufacturing steps which take place after the tube is formed. They may take place as the plastic tube is extruded, in which case the process is called an "in-line" process. On the other hand, they can take place "out of line" using rolls of tubing produced by an extruder at another location in the plant or using rolls produced at another locality. The two main downstream operations are the formation of the bags themselves and the packaging of the bags thus produced. It is the former operation with which the present invention is primarily concerned. The prior art relating to this operation will be described in greater detail below. With regard to the packaging operation, this is usually accomplished by folding individual bags so they fit into a box or by rolling the bags into a roll (either over a core or in the form of a coreless roll). Rolls are typically placed in a bag or folding carton for sale.

The rolling of individual bags into a roll has certain advantages to the consumers because the bags dispense one-at-a-time. The preparation of such rolls of individual bags, however, is difficult. A prior art patent which describes such a roll of individual bags is U.S. Pat. No. 3,826,361 issued to William F. Heckrodt on July 30, 1974 for "Plastic Bag Dispenser System."

Other conventional types of rolled bags are easier to prepare than the rolls of individual bags. These rolls have a perforation over the width of the bags adjacent the transverse bag forming seal which must be torn apart by the consumer. The separation of the bags may be difficult under certain circumstances because the location of the perforation may be hard to find, for example, under poor light conditions. A bag system from which individual bags could be easily separated from a continuous roll would be a significant advance in this art.

Proceeding now to a more detailed description of the bag making operation itself, the various known prior art devices are designed for either in-line or out-of-line operation and involve two separate operations on the tube. The first is to form a seal across the width of the tube by a sealing bar. The bar, under the influence of pressure, melts the two faces of the flattened tube and seals them together. The second operation is to perforate the sealed tube, which is usually accomplished by a bed and fly knife perforation assembly. The perforation is also provided across the width of the bag and usually adjacent to but slightly spaced apart from the seal.

Many problems are encountered in optimizing the design of a bag making machine. First, the machine must be capable of running at high speeds, a problem which is becoming more pronounced as extruder technology advances. Modern extruders are capable of producing film at a rate of 400 feet/minute or more, yet commercial bag machines are not capable of keeping up with film tube production.

Second, because the formation of the bag seal involves melting of the plastic, the bag machine must be able to handle the film at high speed without pulling the heated seal apart.

Third, it is difficult to maintain the correct distance between the seal and perforation (the "skirt length") as the film proceeds through the machine.

Fourth, if it is desired to produce different sizes of bags on a single piece of machinery, the techniques involved in prior machines for changing bag size are cumbersome, expensive and time consuming.

Fifth, prior art bag machines do not make bags which can be easily separated from a roll.

A more detailed description of several prior art bag machines will illustrate these problems. Most commercial machines today are of the shuttle or oscillating type, where the film stops for a brief period of time while the perforation and sealing operations are performed. While the film is stationary, heat and pressure are applied and a small amount of dwell time is provided to allow the seal to cool. While such machines have proven to be reliable and commercially acceptable, film extruder speeds are now much higher than this type of bag making equipment can handle. Moreover, since these machines usually require a seal width of at least 33 inches, the oscillation mechanism becomes bulky, and only a limited amount of running time can be accomplished without mechanical breakdown of the oscillation mechanism. However, the main disadvantage of this type of machine is running speeds, with 280 feet/min. being the fastest oscillating line speed known to the present inventor.

Another type of known bag making equipment operates on a rotary principal in which a sealing drum rotates on a shaft and the film is maintained in contact with the drum by use of a tensioning web or sealing blanket. The seal is made by one or more sealing bars located at the surface of the rotating drum. The surface of the drum is usually coated with rubber lagging.

In rotary bag machines, such as the Polyrocket machine, the drum size and number of sealing bars determines the bag size, and, accordingly, to vary the bag size involves drum replacement. Drum changes frequently take 2-4 hours and require skilled mechanics to reposition the sealing blanket, electrical systems, drives, etc.

Another problem with prior art rotary machines has to do with the seal, and arises from the fact that the "hot" seal is transported in the machine to the perforation section. This must be accomplished very carefully to avoid stretching and weakening of the seal. Because the film requires both perforation and folding after the seal is formed, any tension applied to the film downstream of the sealing mechanism would be transferred back to the seal area causing the aforementioned stretch and weakening problems.

Finally, in prior art rotary machines, the perforation section is followed by folder boards which reduce the width of the bag from about 34 inches to a packaging size of about 8½ inches (by folding the flat tube twice) for sale in conventional retail size boxes or rolls. To locate the folding boards after the perforation section requires additional space in the manufacturing area.

A bag making machine which overcomes the aforementioned disadvantages of prior art machines would represent a significant advance in the art.

OBJECTS AND SUMMARY OF THE INVENTION

It is a primary object of the present invention to provide a bag making machine which overcomes the above-noted disadvantages of the prior art bag making machines.

Another object of the present invention is to provide a bag making machine which may be employed to produce a variety of different length bags on a rotating drum which has a variable diameter.

A further object of the present invention is to provide a rotary bag making machine having an automatic sealing blanket tensioning system to compensate for different drum diameters.

A different object of the present invention is to provide a bag making machine which sets the web seal quickly to avoid problems with web seal stretch.

Yet another object of the present invention is to provide a bag making machine which includes a new location for the folder boards.

Still another object of the present invention is to provide a bag making machine which produces folded bags which are partially cut and partially perforated to provide for easy dispensing of the bags.

Another object of the present invention is to provide pull rolls in a bag making machine which do not stretch or weaken the bag seal and which function to pull the film over the folding boards in advance of the perforation and cutting section.

Another object of the present invention is to provide a bag making machine having a new and different perforation section.

How these and other objects of the present invention are accomplished will be described in the following description of the preferred embodiment, taken in conjunction with the drawings. Generally, however, they are accomplished by providing a bag machine which includes a rotary drum constructed of a plurality of slats and which includes a gear mechanism adapted for infinite variation of the drum diameter between a first smaller diameter and second larger diameter. A sealing blanket is provided for the drum and is automatically adjusted for different drum diameters to provide proper tension on the film as it passes around the expandable drum. A chill roll is located at the exit of the drum-blanket nip. The chill roll may be constructed of metal to provide rapid cooling of the web seal and may additionally be provided with a cooling media, such as chilled water, if required. From the cooling roll, the web passes over folding boards and then through pull-rolls, the latter serving to pull the film over the boards. Since the seal has been previously cooled by the chill roll, the pull rolls may perform their designated function without undue concern for the integrity of the web. Finally, the film, after being folded, passes through a unique perforation-cutting section where the edges of the film are cut, while the center portion of the bag is perforated, to provide easy dispensing plastic bags. A variator may also be provided within the bag making machine to insure proper spacing of the cut-perforation adjacent to but spaced apart from the seal. Other modifications to the preferred embodiment will be described in the following description.

DESCRIPTION OF THE DRAWINGS

FIG. 4 is a side elevation of the bag making machine according to the preferred embodiment of the present invention, partially in section;

FIG. 7 is a longitudinal elevation view of the bed and fly knife used in the bag making machine of the present invention; and, FIG. 8 is a detailed front elevation of the fly knife used in the present invention;

FIG. 9 is a section taken along the line 9—9 of FIG. 8;

FIG. 10 is a top plan view, partially in section, of a box and bags produced on the bag making machine of the invention; and FIG. 11 is a perspective view of a dispenser box and bags produced on the bag making machine according to the preferred embodiment of the invention and illustrating the easy dispensing nature thereof.

Figure 1:
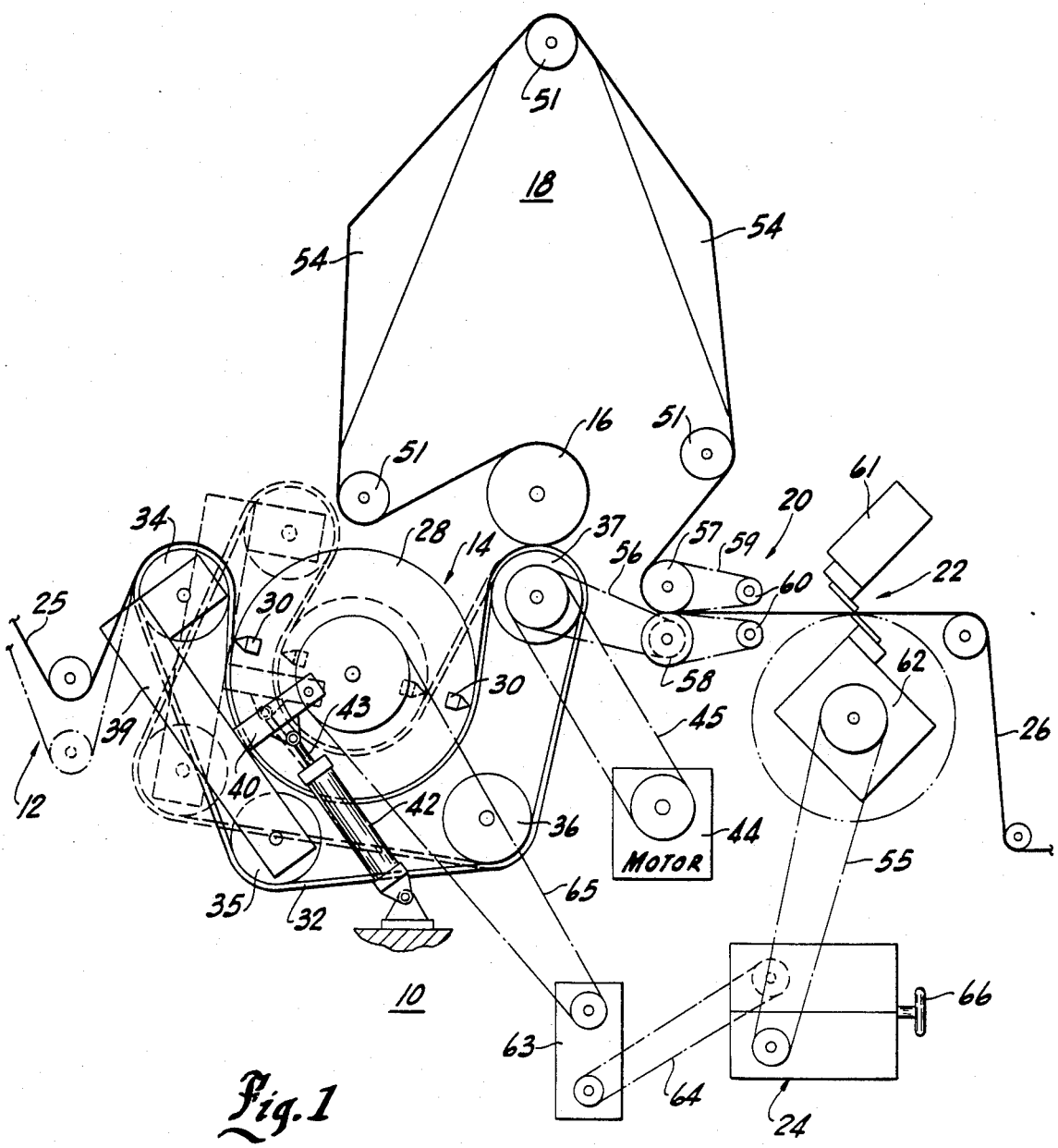
FIG. 1 is a schematic illustration of the bag making machine according to the preferred embodiment of the present invention.

Like reference numerals are used in the various drawings to show like components. To improve the clarity of the description of the major features of the present invention, only general descriptions are provided for components which are well known in the art and components which could be variously embodied by one skilled in the art after reading and understanding the principles of the present invention.

DESCRIPTION OF THE PREFERRED EMBODIMENT

Before proceeding to a more detailed description of the preferred embodiment, it will be helpful to briefly acquaint the reader with the basic elements of the present invention. For this purpose, reference should first be directed to the schematic diagram of FIG. 1. In this Figure, the bag making machine 10 according to the present invention includes certain major elements: a dancer 12, a sealing drum and blanket assembly 14, a chill roll 16, folding board system 18, pull roll system 20, perforation (and preferably a cutting) system 22 and a variator assembly 24. Each system will be described in detail hereafter, and to help explain the schematic, a flattened plastic film tube is shown entering the device at 25 and a series of connected and perforated (and preferably cut) bags is shown leaving the device at 26.

The dancer assembly 12 is shown here and in the other drawings in only general form, as dancers are well-known. It functions to properly time the bag machine speed with the upstream equipment (i.e., the extrusion equipment). In practice, the dancer is a free running roll, the axis of which is vertically movable on a chain (not shown in this Figure). The chain is coupled to a sensing mechanism so that the speed of the bag machine can be slaved to the speed of the extruder. If the bag machine 10 is used out of line, the dancer roll may still be employed, but it does not regulate the bag machine speed. In this case, the bag machine speed will be set manually.

The sealing drum and blanket assembly 14 consists of a cylindrical drum 28, which, as is more fully described hereafter, is capable of being varied in diameter. That feature is illustrated in FIG. 1 by the dotted line. A pair of sealing bars 30 are also shown in this Figure and form the cross seal across the flattened film tube. A blanket 32 is mounted on rollers 34, 35, 36 and 37 for surrounding a portion of drum 28 in such a way that the film passes between blanket 32 and drum 28 while the seal is being formed. Rollers 34 and 35 are mounted to an elongate frame 39 which is pivotable between the full and dotted line positions shown in this Figure. Frame 39 includes a perpendicular plate 40 near its midsection, the latter being coupled to an air cylinder 42 having an extensible piston 43. It will be appreciated that extension of piston 43 causes rollers 34 and 35 to move to the dotted line position when the drum diameter decreases, thereby maintaining tension of the blanket 32 against the drum 28.

Roller 37 is driven from a motor 44 by belt 45 to drive blanket 32, and in turn the blanket will rotate drum 28 due to the tension which exists between these components.

Once the cross-sealed bags leave the drum-blanket assembly, the continuous film passes over a free-running chill roll 16 mounted near the exit nip of blanket 32 and drum 28. While not shown in this FIGURE, chill roll 16 may be provided with an inlet and outlet for a cooling medium (such as cold water, chilled air, etc.). The purpose of roll 16 is to quickly cool the seal made by sealing bars 30.

The next component of bag machine 10 is the folding board system 18 which is of conventional design and which will not be described in detail. System 18 includes a plurality of idler rollers 51 and folding boards 54. As is known to the art, the flat tube of film is folded longitudinally on the boards 54 to reduce its width to the desired final width. In commercial practice, the width may be reduced from about 34 inches to about 8½ inches on two folding boards for consumer type packages.

The next feature of bag machine 10 is the pull roll system 20 which includes a pair of pull rolls 57 and 58 which are arranged for pulling the traveling film over the folding boards. These rollers have a constant drive speed (i.e., they are coupled to roller 37 by belt 56) and include a plurality of ropes 59 and rope return rollers 60 to insure that the film passes through this section without being caught in or wrapped around the rolls.

Following pull roll section 20 is a perforation section 22 which is constructed and arranged for perforating the folded film adjacent to the cross-seal to complete the bag manufacturing process. Perforation section 22 includes a bed knife 61 and a rotating fly knife 62, the latter being driven by belt 55 from the variator assembly 24. It should be understood that the fly knife 62 rotates in synchronization with the drum 28.

In the preferred embodiment of the invention, the fly knife 62 has a unique construction and function. It includes (as will be illustrated later) a knife section on either end of its blade and a series of perforation grooves or notches in the middle. The function is to cut the layers of plastic film on either side of the folded traveling bags and to perforate those layers in the middle so that the bags stay connected to one another while packaging is being completed.

The final system is the variator system 24 which driven from a gear box 63 by belt 64. The gear box is driven by the drum 28 through belt 65. Variator system 22 also includes a hand wheel 66 which is used to vary the phase of the fly knife 62 with respect to drum rotation in a manner which will be described in detail later. It should be recognized at this point, however, that the variator may be adjusted while the bag making machine 10 is in operation.

Figure 2:
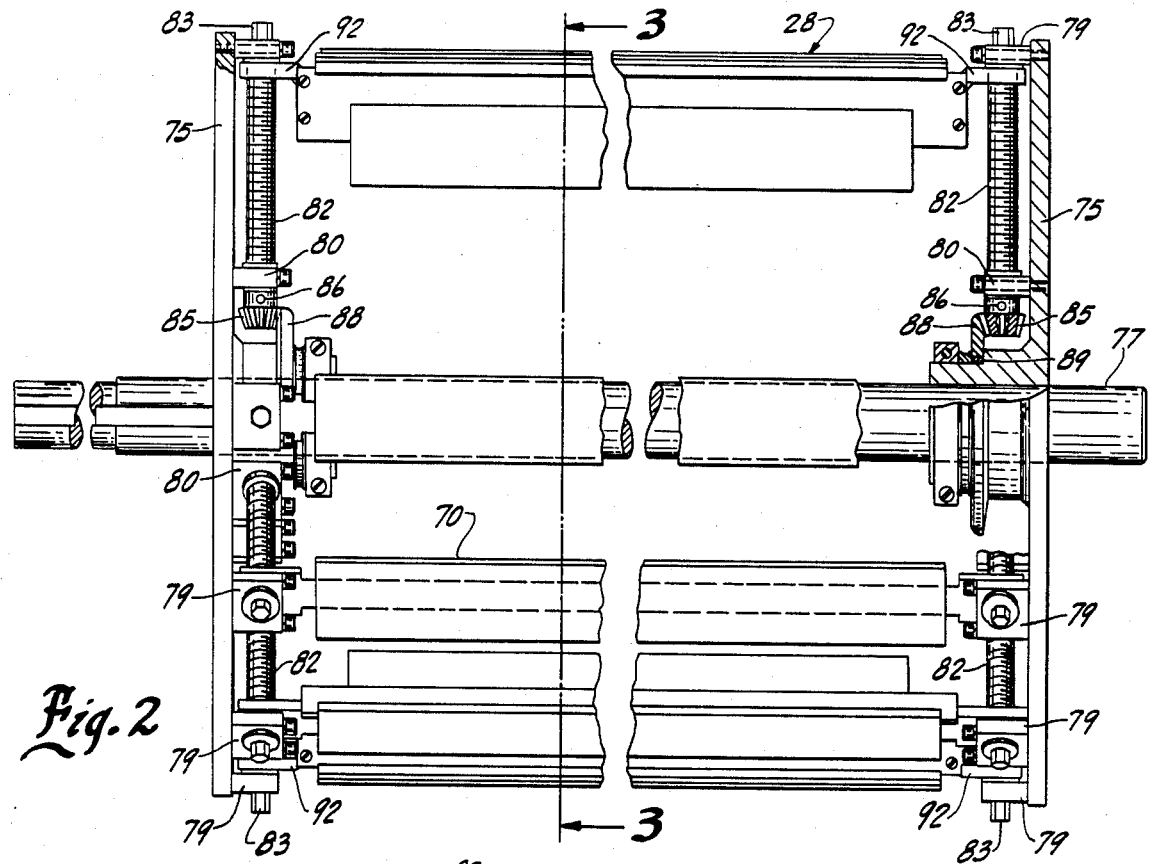
FIG. 2 is a longitudinal elevation (partially in section) of the expandable sealing drum according to the preferred embodiment of the present invention.
Figure 3:
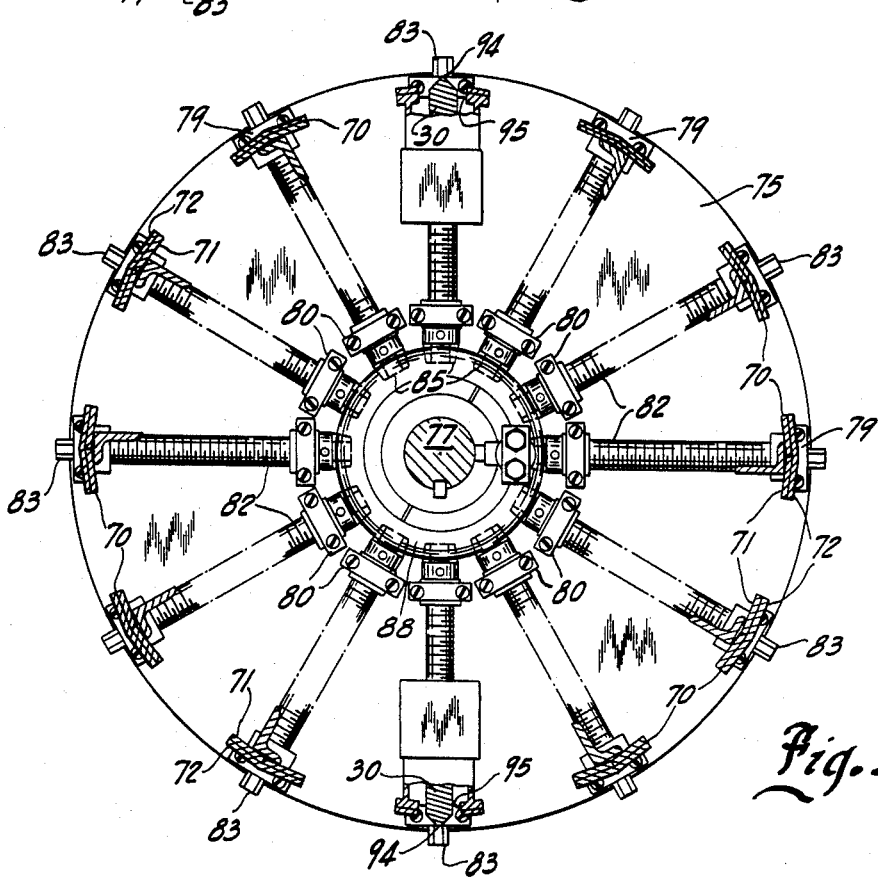
FIG. 3 is a cross-sectional view taken along the line 3—3 of FIG. 2.

Proceeding now to the more detailed description of the preferred embodiment of the present invention, reference now will be made to FIGS. 2 and 3 to illustrate the expandable sealing drum 28. Drum 28 is generally cylindrical and is comprised of a plurality of elongate slats 70. Each slat 70 includes a steel base 71 having a slightly curved exterior surface. A rubber lagging 72 is provided on the exterior surfaces to assist in maintaining proper traction between blanket 32 and drum 28.

Drum 28 also includes a pair of generally circular end plates 75 and an axial shaft 77 extending through the center of drum 28 and mounted in suitable bearings to permit rotation of drum 28. Twelve mounting plates 79 having holes therein are attached to the interior sides of each of end plates 75 near the outer edge thereof, the axis of the openings of each being radial with respect to the axis of shaft 77. Similar plates 80 are affixed to end plates 75 inwardly of plates 79 so that twelve pairs of spaced apart mounting plates (79 and 80) are disposed equidistantly around each of end plates 75.

A threaded rod 82 is placed through the holes in plates placed through plates 79 and 80, one end of which extends outwardly therefrom. The outer end of rod 82 is provided with a hex head 83 (or other suitable configuration) so that the rod can be rotated by a wrench or other suitable tool. On the inner end of rod 82, a mitre gear 85 is mounted using set screws 86. Rotation of rod 82 will then cause rotation of the mitre gear 85.

A pair of ring gears 88 are rotatably mounted to a machined hub of end plates 75 on bearings 89 and are constructed and arranged to mesh with mitre gears 85. It should be appreciated then that rotation of any one of the rods 82 causes rotation of the ring gear 88 and, in turn, the rotation of all twelve of the threaded rods 82 which are coupled to that particular ring gear.

Slats 70 are coupled to the threaded rods 82 by a threaded plate 92 fastened to each end of slats 70. Rotation of the rods 82 will cause plates 92 to travel up and down the length of the rods. Rotation of the hex head 83 in one direction will then cause the slats to move toward the shaft, whereby the drum diameter will be reduced, while rotation in the opposite direction will cause a drum diameter expansion.

The final features of the sealing drum are the sealing bars 30, which themselves are of conventional design. Bars 30 include a sealing edge 94 and two of the slats 70 are split at 95 so that the edge 94 protrudes slightly above the surface of the lagging 72. The electrical slip rings for the sealing bars are not shown but are conventional.

From the foregoing description, it should be understood that two cross seals will typically be made for each rotation of drum 28, but that it is also possible to deenergize one bar 30, so that only a single seal is formed during each drum rotation. Combined with the variable diameter, a wide variety of bag lengths then can be made using the apparatus of the present invention.

Proceeding now to FIG. 4, further features of the present invention can be understood. A frame 100 is provided for bag machine 10, which includes vertical supports 102 at the entrance end on which gear rollers 103 for the dancer mechanism 12 are mounted. A chain 104 is coupled to rollers 103, and the dancer roller itself 105 is coupled to the chain 104. As previously described, dancer 12 is a horizontal roller which can move up or down depending on the tension in the film to regulate the bag machine speed.

Frame 100 also includes base members 107 and a pair of top frame elements 108 for supporting the moving components of the system. Another pair of vertical supports 110 is provided between frame elements 107 and 108 to provide structural integrity. Frame elements 110 are downstream of the elements 102 and in the general vicinity of the axis of drum 28. Yet another pair of vertical supports 112 are mounted between elements 107 and 108 and are located intermediate frame elements 102 and 110 and to the left of the axis of drum 28. The bearings for drum 28 are shown at numeral 115.

The belt tensioning system previously described is coupled to supports 112. More specifically, the plate 40 is pivotably coupled at its free end to supports 112 so that extension of the piston 43 of cylinder 42 will cause movement of rollers 34 and 35 to accomplish the desired movement of plate member 39. This Figure also shows the bearings 116 for roller 35 and a turnbuckle assembly 117 coupled to a bracket on plate 39 and to support 102. The turnbuckle is removed or loosened during changes of drum diameter and is then reinstalled or tightened after completion of the drum change to hold rollers 34 and 35 in the proper position and to take strain off the cylinder 42.

Roller 36 is supported in bearings 119 affixed to the downstream side of supports 110, and as previously mentioned, this roller remains fixed during operations of machine 10.

Another pair of horizontal supports 122 are located near the mid-point of support 110 and extend toward the exit end of the machine 10. Bearings 123 for roller 37 are supported thereon. Roller 37 includes a pair of pulleys 125 at the drive end thereof. One of the pulleys is for belt 45 and the other is for belt 56. The motor 44 is mounted to base support 107 and includes a pulley 132 for the main drive belt 45. A belt tensioning roll 130 is provided to maintain proper tension on belt 45.

The gear box 63 includes an input pully 138 and an output pully 139, and belts 65 and 64 coupled respectively thereto. Gear box 63 is constructed so that a one to one or a two to one ratio may be obtained between pullys 138 and 139 to allow for a full range of bag sizes when combined with the varying drum diameter and selective seal bar features described above.

The chill roll 16 is mounted at the outward end of support 108 in bearings 137 and the folding board system 18 is shown again schematically disposed thereabove.

The pull roll system 20 is mounted to horizontal supports 122 and includes a drive belt 56 coupled to pulley 125 of roller 37. The belt 56 is coupled to the lower pull roll 58 and proper tension is maintained by another tensioning roll 142. The rope return rolls 60 and upper pull roll 57 are also mounted to support 122.

At the downstream end of bag machine 10, yet another pair of vertical supports 145 couple supports 122 and 107. These supports are provided for the bearings of the fly knife 62. The rotating knife 62 is a rather large device of substantial mass as is known in the fly knife art. The weight combined with the rotation causes the desired cutting force to be imparted to the plastic film. A replaceable knife blade 150 is coupled to a machined surface of the fly knife by bolts 151, which will be described in detail later. The bed knife 61 is supported between supports 122 and also includes a replacable knife blade 153 held thereto by bolts 155. Bed knife 61 remains fixed during the cutting and perforation steps of the present invention but may be adjusted to maintain proper cutting.

A pair of vertical posts 160 are secured to the ends of supports 122 and base 107 and an exit roller 162 is located therebetween. This roller guides the bags produced on machine 10 to the downstream folding or rolling equipment.

Figure 6:
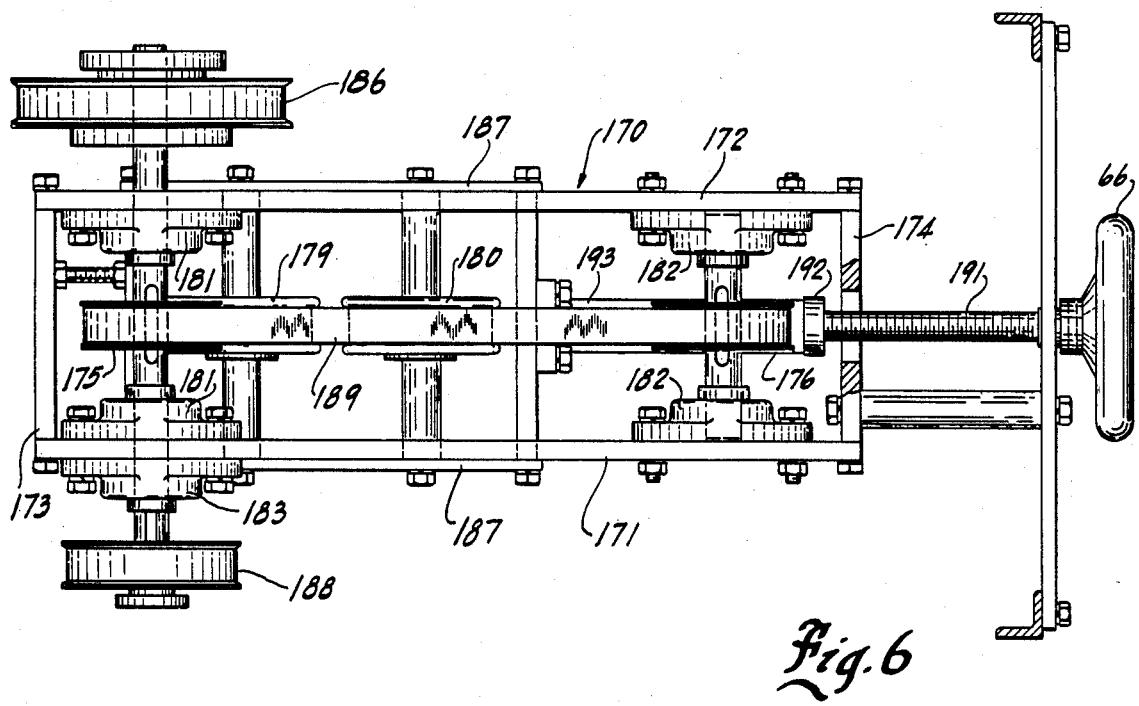
FIG. 6 is a top plan view of the variator.
Figure 5:
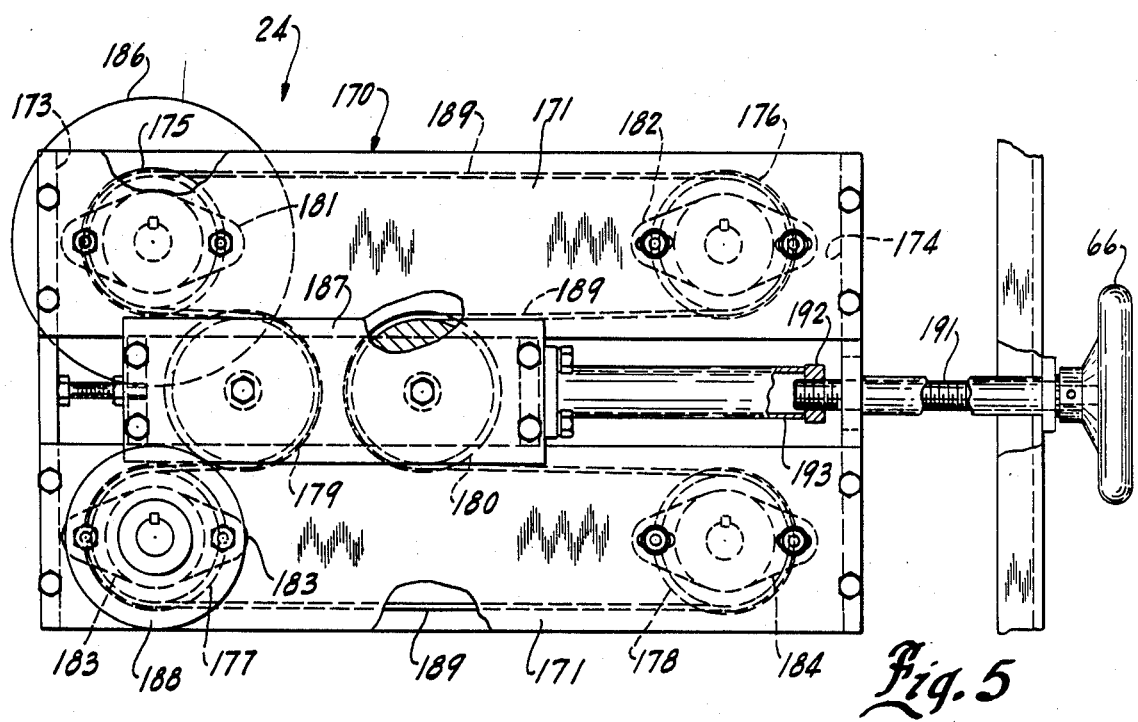
FIG. 5 is a side elevation of the variator assembly of the bag making machine according to the preferred embodiment of the present invention, partially in section.

The final component of the present invention to be described is the variator assembly 24. The variator 24 is shown in detail in FIGS. 5 and 6 to include a rectangular housing 170 having a front wall comprised of two spaced apart panels 171, a rear wall comprised of two spaced apart panels 172, left end wall 173 and right end wall 174. Housing 170 also includes six pulleys 175-180 disposed between the front and rear walls, the first four of which are disposed in bearing sets 181-184. As shown in the side view of FIG. 5, these four rollers are located in the upper and lower corners of housing 170 at the mid-plane thereof. As seen in FIG. 6, roller 175 is coupled to an input pulley 186 which in turn is coupled to belt 64. Roller 177, on the other hand, is coupled to an output pulley 188 which is coupled to belt 55. Another tensioning roller 165 is provided for the latter.

The middle two rollers 179 and 180 are mounted in a box 187 which is slidably mounted between the upper and lower panels 171 and 172 of the front and rear walls so that it can be moved between the right and left ends of housing 170 as determined by rotation of hand wheel 65. Finally, a belt 189 is looped around the six pulleys as shown in dotted line in FIG. 5.

From this description, it should be apparent that the input pulley causes belt 189 to rotate the other six pulleys and serves to drive the output pulley 188. As long as the two central pulleys 179 and 180 remain stationary, the knife phase position will remain constant with respect to the rotation of the drum 28. However, if it is desired to vary the skirt length of the bags being produced, the hand wheel can be rotated (while the machine is in operation) to cause the rollers 179 and 180 to move in the desired direction. Such movement causes an alteration of the input-output phase and accordingly causes a change in the phase of the knife-drum relationship.

The hand wheel 65 is coupled to an elongate threaded rod 191 which is received in a threaded end plug 192 of a cylinder 193. Cylinder 193 is coupled to box 187.

The fly knife 62 is shown in greater detail in FIG. 7. A fly knife mounting surface 195 extends across the knife 62 and contains a plurality of holes 196 for attachment of the blade element 150. A similar mounting surface 197 is provided on the bed for mounting bed knife 153 and it contains a plurality of holes 198 to receive bolts 155. The knives 150 and 153 are shorter than the support areas 195 and 197 to allow for accurate placement of the blades anywhere along those surfaces.

Knife blade 150 is shown in FIG. 8 to include a rectangular plate 204 having four knife edges 206 and a plurality of holes 207. Blade 150 can be rotated front to back or top to bottom to provide four different cutting surfaces. A plurality of grooves 208 are cut into the top and bottom of blade 150 at the middle portion thereof to give the perforation capability of the present invention. From this description, it will be apparent that when the knife 150 is rotated against bed knife 153, with the folded plastic therebetween, the knife edge 206 will cut the layers of plastic while the grooves 208 will create a perforation of the layers of plastic. The result is a continuous stream of partially perforated and partially slit bags coming out of the knife section. The bed knife 153 is generally similar to knife 150 but without the grooves 208. The width of the knife section and the perforation sections are not critical, so long as enough perforations are made to keep the bags attached to one another during packaging and so that the side slits are readily visible to a bag consumer and assist in the easy dispensing system which will not be described.

That feature is illustrated in FIGS. 10-11 where a box 215 of bags is shown. The individual bags 217 are wound on a core or in a coreless roll or the bags 217 could be folded and placed into the box. An opening 220 in the box 215 is provided for the dispensing of the product.

As illustrated, the bags 217 come out of the box 215 (by rotation of the roll within the box or by simply unfolding of the bags as they are pulled out), until the connection of two adjacent bags reaches the opening 220. At that point, when additional pull is exerted on the forward bag, the slit side sections 225 will pop outside the opening and will become readily visible to the consumer. The perforation section 227 may then readily be torn apart by the user.

It will also be observed from FIG. 9 that because the opening 220 is small compared to the length of box 215, the trailing bag slits 225 will have a tendency to catch on the sides of the box adjacent opening 220 so that the box also assists in the easy dispensing of the bags as the leading bag is pulled therefrom. In practice, a gentle pulling of the lead bag 217 causes a total separation of that bag from the trailing bag.

The present invention may be variously embodied without departing from the teachings of the present invention. For example, the cut-slit system can be employed with conventional bag making machines (e.g. those which do not include the expandable drum or chill roll features hereof) and vice versa. The cut and slit could also be formed by separate knife and perforation devices. So while the present invention has been described in connection with a particular preferred embodiment, it is not to be limited thereby but is to be limited solely by the claims which follow.

I claim:

1. A machine for making plastic bags from plastic film moving along a longitudinal path comprising:
   drum-shaped rotatable sealing means along said path for sealing said film transversely, having at least one sealing bar thereon and means for driving said sealing means operatively associated therewith,
   blanket means surrounding a portion of said sealing means, said blanket means comprising a continuous belt,
   means for driving said blanket means operatively associated therewith,
   means along said path for both cutting and perforating said film transversely to form easily separable interconnected bags, and
   folding means located along said path intermediate said sealing means and said cutting and perforating means comprising one or more boards, for folding the film along lines parallel to the direction the film is moving, and
   wherein the diameter of said sealing means is infinitely variable between a first size in which said sealing means has a first diameter and a second size in which said sealing means has a second and larger diameter.

2. The invention set forth in claim 1 wherein said cutting and perforating means further comprises a central means for perforating and means on either side thereof for cutting, wherein plastic film acted upon by said cutting and perforating means is cut on said either side and perforated by said central means.

3. The invention set forth in claim 1 wherein said machine further includes plastic film cooling means located between said sealing means and said folding means.

4. The invention set forth in claim 3 wherein said cooling means comprises a chill roller means.

5. The invention set forth in claim 1 wherein said sealing means is a cylindrical drum and wherein said means to drive said drum comprises said blanket means.

6. The invention set forth in claim 5 wherein said blanket means is mounted adjacent said drum on a plurality of rollers and wherein said means for driving said blanket means comprises a motor coupled to one of said rollers.

7. The invention set forth in claim 6 wherein the axis of each of said rollers is parallel to the axis of said drum and wherein said rollers are constructed and arranged so as to insure contact between said drum and said blanket means.

8. The invention set forth in claim 7 wherein at least one of said rollers is coupled to a blanket tensioning means and is movable, whereby said blanket means remains in contact with said drum when said drum diameter is at its first size, its second size or any size therebetween.

9. The invention set forth in claim 1 wherein said folding means are constructed to produce a double fold in said plastic film.

10. The invention set forth in claim 1 wherein said bag machine further comprises a pair of pull rollers following said folding means to pull plastic film thereover.

11. A bag making machine of the type which includes, along the path of a moving flattened tube of plastic material, means for forming a seal across said tube of plastic material, means for perforating said tube of plastic material adjacent and generally parallel to said seal, and means for folding said tube of plastic material, the improvement wherein said machine further comprises means for slitting a portion of said tube of plastic material adjacent and generally parallel to said seal, said perforating means and said slitting means being arranged downstream of said folding means and being combined so that slitting and perforation are accomplished simultaneously on the folded flattened tube along a line extending across the tube with the tube being discontinuously perforated in the center and continuously slitted on both sides.

12. The invention of claim 11 wherein said folding means is located intermediate said sealing means and said slitting means.

13. The invention set forth in claim 12 wherein said perforating means and said slitting means comprise a single elongate knife means, said knife means having a knife edge on either end thereof adapted to slit said plastic material and a plurality of grooves intermediate said knife edges which are adapted to perforate said plastic material.

* * * * *